United States Patent [19]

Woltering

[11] Patent Number: 5,172,599
[45] Date of Patent: Dec. 22, 1992

[54] VIBRATORY DEVICE

[76] Inventor: Howard M. Woltering, Rte. 2, Box 454, Foster, Ky. 41043

[21] Appl. No.: 700,462

[22] Filed: May 15, 1991

[51] Int. Cl.$^5$ .......................................... F16H 33/00
[52] U.S. Cl. .......................................... 74/61; 74/87
[58] Field of Search .................. 74/5.34, 5.37, 61, 62, 74/86, 87

[56] References Cited

U.S. PATENT DOCUMENTS

| | | | |
|---|---|---|---|
| 2,309,172 | 1/1943 | De Kanski | 209/367 |
| 2,730,237 | 1/1956 | Linke | 209/366.5 |
| 2,732,720 | 1/1956 | Taylor | 74/5.34 |
| 3,398,586 | 8/1968 | Griffin et al. | 74/5.34 |
| 3,404,854 | 10/1968 | Di Bella | 244/62 |
| 3,473,396 | 10/1969 | Schwake | 74/61 |
| 3,505,886 | 4/1970 | Hill et al. | 74/61 |
| 3,648,525 | 3/1972 | Reed | 74/5.34 |
| 3,810,394 | 5/1974 | Novak | 74/87 |
| 3,981,403 | 9/1976 | Zimmermann | 74/61 X |
| 3,998,107 | 12/1976 | Cuff | 74/84 |
| 4,266,434 | 5/1981 | Burns | 74/61 |
| 4,280,368 | 7/1981 | Woltering | 74/61 |
| 4,647,247 | 3/1987 | Sandstrom | 404/75 |
| 4,884,456 | 12/1989 | Zachystal | 74/87 X |
| 4,929,087 | 5/1990 | Brigolle | 366/111 |

OTHER PUBLICATIONS

Burton, Ralph, Vibration and Impact, Addison-Wesley, Reading, Mass., 1958, pp. 88-95.
Carl Machover, Basis of Gyroscopes, vol. 1, John F. Rider Publ. NY, 1963, pp. 12-25.
Errol G. Kelly and David J. Spottiswood, Introduction to Material Processing, John Wiley & Sons, NY 1982, pp. 172-173; 176-177.

Primary Examiner—Leslie A. Braun
Assistant Examiner—David W. Laub
Attorney, Agent, or Firm—William S. Ramsey

[57] ABSTRACT

A vibratory device which provides vibratory motions for screens, shakers, and vehicles which utilize such motions is described. Rotatory motion is imparted to a rotating frame which transmits to motion to an unbalanced weight assembly. Rotation of the unbalanced weight assembly generates vibratory forces in defined directions. The rotating frame imparts a gyroscopic effect which stabilizes the vibratory device in all directions other than those in which vibration is desired.

7 Claims, 4 Drawing Sheets

VIBRATORY DEVICE

FIELD OF THE INVENTION

This invention relates to mechanical movements for converting rotary motion to gyratory motion in which the motion is changed by means of unbalance weights and in which the motion is changed by means of inertia or centrifugal means.

DESCRIPTION OF RELATED ART

The vibratory device of this invention combines a gyroscope-like rotating mass along with a vibratory force generator comprised of two unbalanced rotating weights. The rotating gyroscope-like mass damps vibrations which would laterally displace the rotating axis. The vibratory force generator provides strong vibratory motions in the direction parallel to the axis of rotation of the rotating mass. Thus the combined effect is to provide defined back and forth vibratory motions along a single line while inhibiting vibratory motions along all other lines.

The unbalanced weight assembly of this invention may be regarded formally as one unbalanced flywheel on a shaft which is synchronized in its motion with another unbalanced flywheel on a shaft (Vibration and Impact, R. Burton, Addison-Wesley Pub. Co. Inc., Reading, Mass., 1958, pages 89-92). Periodic forces which result in vibration in such a device result from the displacement of the center of mass of the flywheel from the axis of rotation, which is located in the center of the rotating shaft.

The displacement of the center of mass from the axis of rotation is called the eccentricity and is given the symbol e. When m is the mass of the flywheel, o is the angular velocity, and F is the force generated, the following relation holds:

$$F = meo^2$$

In the case of the present invention, the displacement of the center of mass of the flywheel from the axis of rotation is effected by the use of arms to displace weights laterally from the axis of rotation of the final spur gears.

The spinning of the rectangular frame about the spin axis defined by the axes of the shafts which connect the rectangular frame to the base provides a gyroscope effect. This provides stability to the vibratory device in all directions other that in back and forth motions along a line parallel to the spin axis. The angular momentum is the property of a gyroscope which determines its tendency to stay fixed in space. (Basis of Gyroscopes, C. Machover, Vol. 1, John F. Rider Publications, N.Y. 1963, pages 12-25.) If H is angular momemtum, I is inertia, and W is spin velocity, then $$H = I W$$

In the present invention, W refers to the rate of spinning of the rectangular frame, and I is a function of the mass of the rectangular frame. H is a measure of the dampening of vibratory forces in directions other that in the direction parallel to the spin axis.

SUMMARY OF THE INVENTION

It is accordingly an object of the present invention to provide an improved vibratory device to assist in screening, sieving, tamping, and settling of aggregate materials, and to motivate vehicles of the sort which are propelled by vibratory forces.

Another object of this invention is to provide a vibratory device which allows efficient conversion of energy by avoiding lost motion.

Another object of this invention is to provide a vibratory device in which the vibratory forces generated are expressed as back and forth motion along a single line.

Another object of this invention is to provide a vibratory device which is stabilized by a gyroscopic effect.

Another object of this invention is to provide a vibratory device in which the vibratory forces may be varied in intensity.

Another object of this invention is to provide a vibratory device with a definitely defined back and forth motion.

Another object of this invention is to provide a vibratory device which is reliable, economical in operation, and may be manufactured at low cost.

Other objects of this invention will in part be obvious and in part appear hereinafter.

DESCRIPTION OF THE PREFERRED EMBODIMENTS

Figure 1:
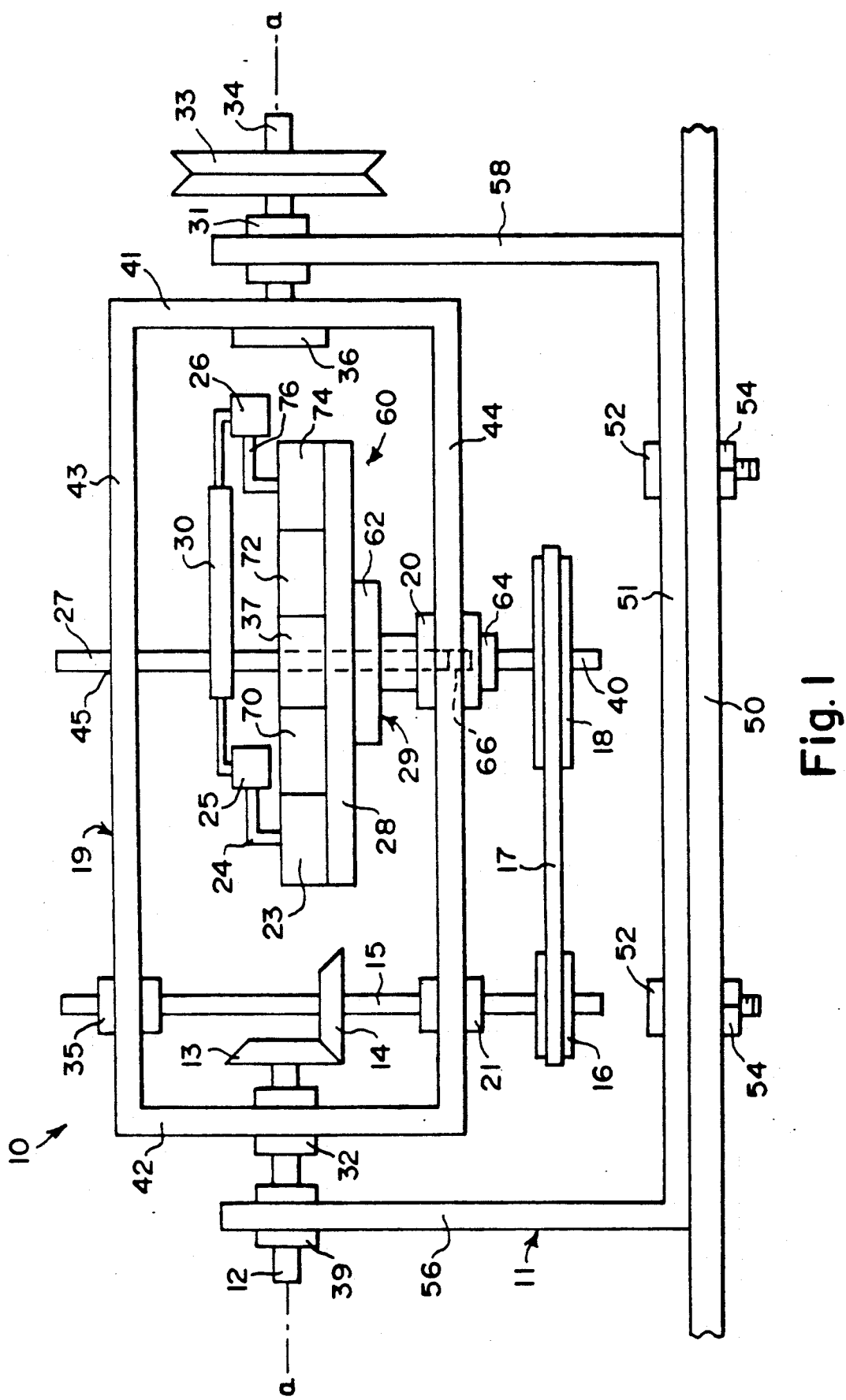
FIG. 1 is a diagrammatic side view of the vibratory device attached to a screening shaker.

FIG. 1 is a side view of a vibratory device mounted on a conventional screening shaker of the type used for separating particles of diverse size, as in separating ore from spoil. Particles to be separated are placed on a screen surface made of a suitable apertured plate, of mesh, or of profile bars (not shown). The screen surface is mounted in a shaker frame. The frame is vibrated in order to prevent blinding or plugging of the aperatures of the screen surface by particles which are just oversize and therefore unable to pass through the screen surface. The screen is a symbolic representative for the work load for the vibratory device. Objects other than screens can be moved by the vibratory device.

The vibratory device 10 has a U-shaped base 11 consisting of a platform 51 and two arms 56 and 58. The platform 51 is firmly fastened to the shaker frame 50 by bolts 52 and nuts 54 or by other suitable fastener means such as by riveting, clamping, or welding. The first arm 56 is equal in length and in width to a second arm 58. The first arm 56 is pierced just below the top of the arm and in the middle of the width of the arm by shaft 12 which is fixedly attached at a first end by mounting member 39 and which extends into the region between the arms of the U-shaped base. Shaft 12 does not rotate. A second arm 58 is pierced just below the top of the arm and in the middle of the width of the arm by shaft 34 which is held in place by bearing 31. Shaft 34 rotates and is mounted coaxially with shaft 12. The axes of shafts 12 and 34 define an axis of rotation a—a which entends parallel to the platform of the U-shaped base and is perpendicular to the surface of the arms of the U-shaped base.

A V-pulley 33 is attached to a first end of shaft 34. The V-pulley is attached by a belt to a motor (not shown) which provides the power to activate the vibratory device. A second end of shaft 34 entends into the region between the arms of the U-shaped base.

A rectangular frame 19 is comprised of first 43 and second 44 long sides of equal length and of first 41 and second 42 short sides of equal length. All sides of the rectangular frame are of equal width. The rectangular frame is mounted between arms 56 and 58 of U-shaped base 11. Short side 42 is pierced at about the midpoint of its length and width by shaft 12 which is rotatively mounted in bearing 32 which is mounted on short side 42. Short side 41 is pierced at about the midpoint of its length and width by the second end of shaft 34 which is fixedly mounted to side 41 by mounting member 36. Thus rectangular frame 19 is suspended from the arms of the U-shaped base 11 by shafts 12 and 34. The rectangular frame 19 is free to rotate about the spin axis a—a formed by the axes of shafts 12 and 34. Rotation of V-pulley 33 causes rotation of rectangular frame 19.

Shaft 12 is fixedly mounted to arm 56 at a first end, passes through bearing 32 in short side 42, and has a pinion gear 13 fixedly mounted on a second end. Pinion shaft 15 pierces long sides 44 and 43 at about 20% of the length of the long sides from short side 42 and pierces the long sides at about the middle of the width of the long sides. Pinion shaft 15 is rotatively mounted in bearing 21 on long side 44 and in bearing 35 on long side 43. Pinion gear 14 is fixedly mounted to pinion shaft 15 at about 2/5 th of the length of the pinion shaft so that pinion gear 14 meshes with pinion gear 13. Rotation of the rectangular frame about the spin axis a—a causes rotation of shaft 15. A gear sprocket 16 is fixedly attached to one end of shaft 15 outside long side 44 of the rectangular frame. Rotation of the rectangular frame about the spin axis causes rotation of gear sprocket 16.

A subassembly termed an unbalanced weight assembly 60 is mounted inside the rectangular frame. A mounting body 29 has a disk-shaped base 62 and a cylindrical end 64. The mounting body has an axial hole 66 piercing the center of the disk-shaped base and extending through about ¾ th the length of the cylindrical end. The hole does not penetrate through the cylinder end. The cylindrical end is mounted in bearing 20 in long side 44 of the rectangular frame at about 6/10 th of the length of long side 44 from side 42 and about the middle of the width of long side 44. The mounting body extends through long side 44 and is free to rotate in bearing 20. A short shaft or stub 40 is fixedly attached at the cylindrical end 64 of mounting body 29.

Gear sprocket 18 is fixedly mounted on stub 40. Gear sprocket 18 has a diameter twice the diameter of gear sprocket 16. Gear belt 17 connects gear sprockets 16 and 18. Thus rotation of shaft 15 causes rotation of stub 40 and mounting body 29.

Mounting shaft 27 penetrates long side 43 at point 45 located at about 6/10 th the length of long side 43 from short side 42 and at about the middle of the width of side 43. Mounting shaft 27 is firmly secured at a first end to long side 43. Point 45 is located so mounting shaft 27 is mounted coaxially with mounting body 29. Mounting shaft 27 extends into the rectangular frame and a second end enters hole 66 in mounting body 29 and extends almost to the bottom of the hole, thus retaining and anchoring mounting body 29 within the rectangular frame 19, although mounting body 29 is free to rotate relative to mounting shaft 27. Rectangular platform 28 has an upper and a lower surface and is penetrated through the upper and lower surfaces by a hole located at about the center of the length and width of the rectangular platform. The rectangular platform is fixedly mounted by its lower surface on disc-shaped base 62 of mounting body 29. Mounting shaft 27 penetrates the hole in the rectangular platform but does not contact the mounting platform. Rotation of mounting body 29 about the axis formed by shafts 27 and stub 40 causes corresponding rotation of rectangular platform 28.

Rotation of frame 19 through a half revolution causes rotation of rectangular platform 28 through a quarter revolution.

Spur gear 37 is fixedly mounted on mounting shaft 27 so that the spur gear is just above but not touching the upper surface of rectangular platform 28.

Intermediate spur gear 70 is rotatively mounted on the upper surface of platform 28 and meshes with spur gear 37. Final spur gear 23 is rotatively mounted on the upper surface of platform 28 and meshes with intermediate spur gear 70.

Similarly, intermediate spur gear 72 is rotatively mounted on the upper surface of rectangular platform 28 and meshes with final spur gear 74. Final spur gear 74 is rotatively mounted on the upper surface of rectangular platform 28 and meshes with intermediate spur gear 72.

Rotation of rectangular platform 28 causes rotation of intermediate spur gears 70 and 72 and corresponding rotation of final spur gears 23 and 74, respectively. The relative rotation rate of gear 70 will equal that of gear 23 if the diameters of such gears are equal, as in the embodiment in FIGS. 1 and 2. This inventions allows variation in the rate of rotation of final spur gear 23 by the choice of diameters of gears 23 and 70. Similarly, the rates of rotation of gears 72 and 74 may be varied by choice of the diameters of these gears. It is important, however, that gear diameters be chosen which insure that the rate of rotation of gear 23 is the same as that of gear 74.

An arm 24 is attached to the upper surface of final spur gear 23. A weight 25 is mounted on the end of arm 24. Similarly, arm 76 is attached to the upper surface of final spur gear 74. A weight 26 is mounted on the end of arm 76. Rotation of gears 23 and 74 causes rotation of arms 24 and 76 and of weights 25 and 26, respectively.

The length of arms 24 and 76 affects the vibration generated, with greater vibration associated with longer arms, within the limits imposed by the necessity of avoiding impact of weights and other components. In any case, arms 24 and 76 must be substantially of the same length.

Figure 2:
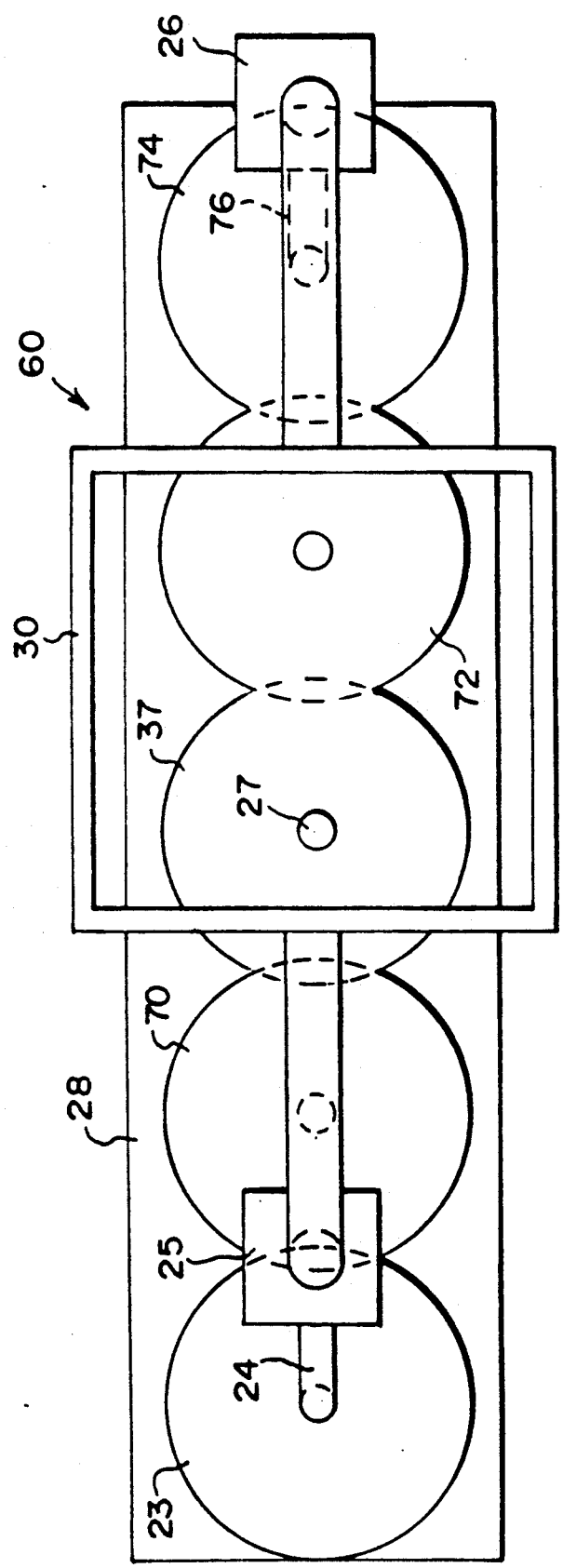
FIG. 2 is a diagrammatic plane view of the unbalanced weight assembly.

Connecting rod or yoke 30 is rotatively connected to weights 25 and 26. Connecting rod 30 counteracts centrifugal forces generated by rotation of weights 25 and 26. In the embodiment of FIGS. 1 and 2 the connecting rod has a rectangular section which enables the rod to move along with weights 25 and 26 without interference with mounting shaft 27. The connecting rod may assume other shapes which achieve this result, such as a U-shape. Connecting rod 30 adds to the eccentric mass.

FIG. 2 is a diagrammatic plane view of the unbalanced weight assembly 60. The unbalanced weight assembly 60 consists of the mounting body 29, rectangular platform 28, mounting shaft 27, fixed spur gear 37, intermediate spur gears 70 and 72, final spur gears 23 and 74, weight arms 24 and 76, weights 25 and 26, and connecting rod 30.

Figure 3:
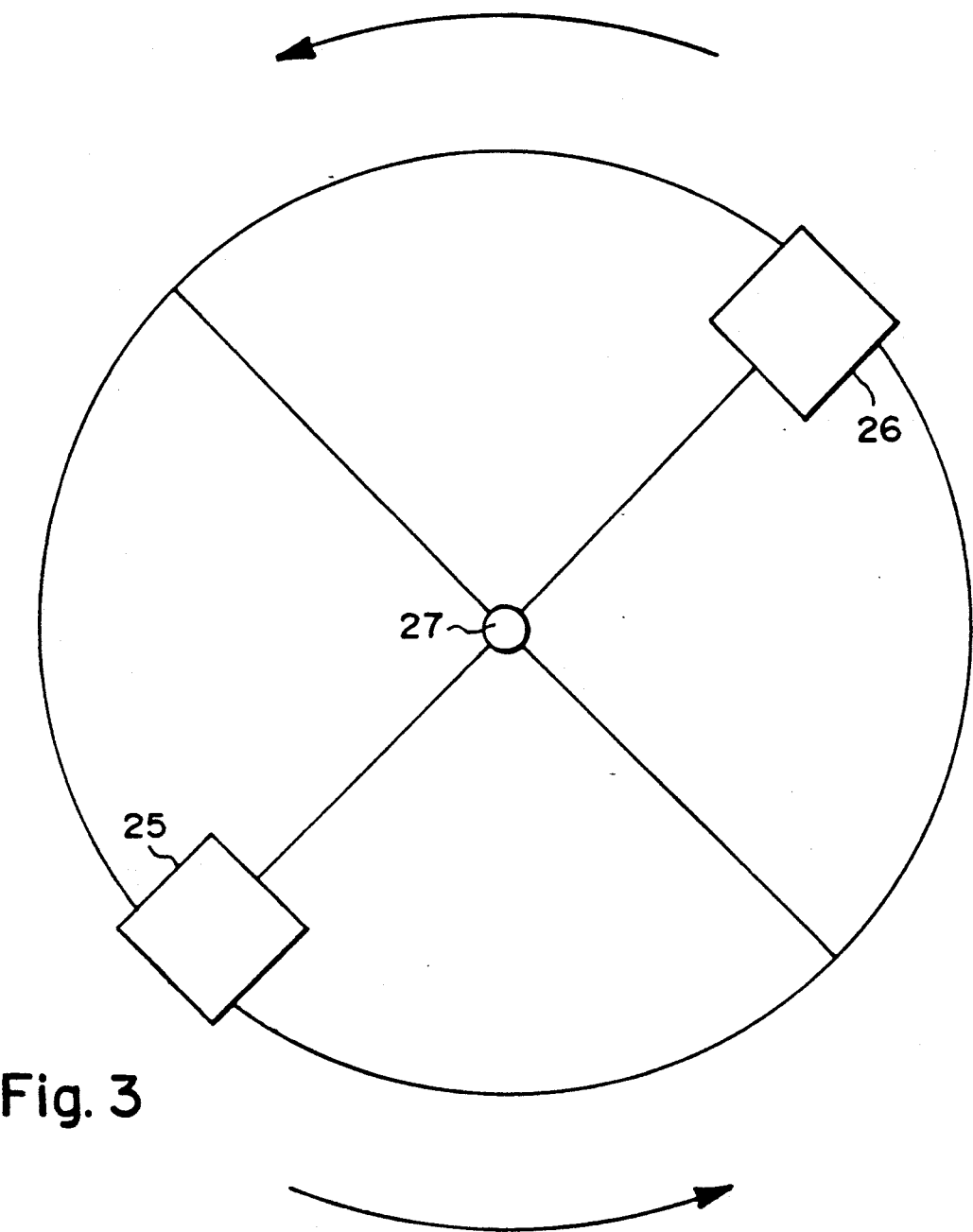
FIG. 3 is a diagrammatic plane view of the rotation of the unbalanced weight assembly showing the rotation of the weights. The vibratory force moves one way for ¼ turn and in the opposite direction for the next ¼ turn.

FIG. 3 is a diagrammatic plane view of the unbalanced weight assembly showing the rotation of weights 25 and 26 in a circular path centered on point 29. In FIG. 3 the unbalanced weight assembly is rotating in a counterclockwise direction as indicated by the arrows. Thus weight 26 moves through four quadrants designated quadrants I, II, III, and IV with quadrant I to the left of weight 26 in FIG. 3 and the other quadrants in counter-clockwise sequence. Weight 26 is furthest from mounting shaft 27 in quadrant I referred to as "long radius" and is nearest mounting shaft 27 in quadrant III, referred to as "short radius". The weight 26 rotates about mounting shaft 27 in a circular path, the center of which is not mounting shaft 27. The velocity along the circular path of weight 26 is at a maximum in quadrant I, slows through quadrant II, reaches a minimum in quadrant III, and increases in velocity in quadrant IV. The velocity of weight 25 varies in complementary fashion, reaching a minimum in quadrant I and a maximum in quadrant III. The variation in the distance of weights 25 and 26 from mounting shaft 27 is shown in FIGS. 4, 5, and 6.

The dynamic variation in distance of the weights from mounting shaft 27 are believed to create the vibratory forces. The vibratory forces move in one direction for ¼ turn and in the opposite direction for the next ¼ turn.

Figure 4:
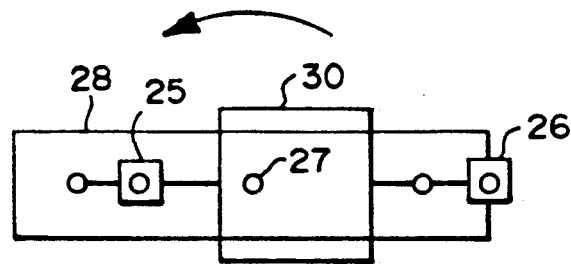
FIGS. 4, 5, and 6 are diagrammatic plane views of the unbalanced weight assembly with the connecting rod as the assembly makes a half turn showing the movement of the rectangular base and weights and indicating the associated centrifugal forces.
Figure 5:
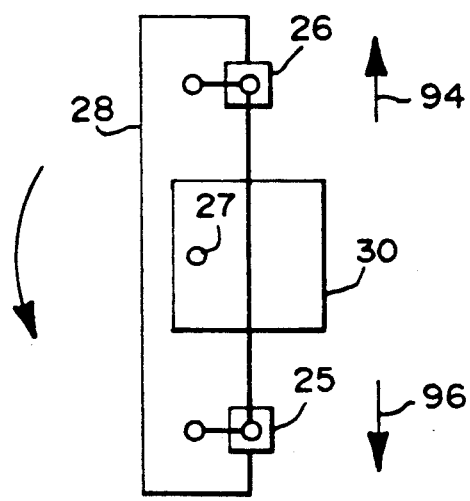
Figure 6:
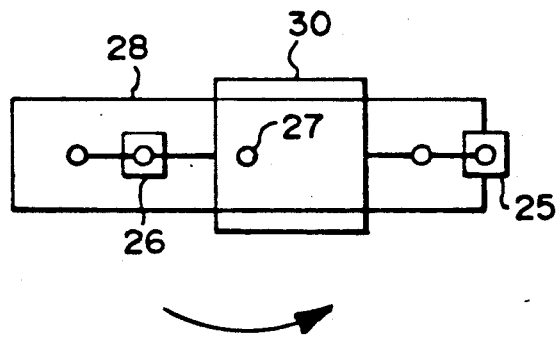

FIGS. 4, 5, and 6 are diagrammatic plane views of the rectangular frame 28 rotating about mounting shaft 27 in a counterclockwise direction through one half rotation. The movements of weights 25 and 26 are shown. Centrifugal forces on weights 25 and 26 result from the revolution of rectangular platform 28 about the relatively fixed mounting shaft 27. Arrows 94 and 96 indicate the direction of centrifugal forces resulting from revolution of weights 25 and 26, respectively, about the axes of the spur gears upon which they are mounted.

In FIG. 5, the directions of the centrifugal forces on weights 25 and 26, represented by arrows 96 and 94, are oriented in opposite directions. Centrifugal forces on a weight, therefore, vary in direction with the location of the weight in the rotation cycle. Connecting rod 30 functions to relieve the strain and stress on the weights generated by the constantly changing direction of centrifugal forces on the weights.

Rotation of the unbalanced weight assembly 60 causes rotation of spur gears 70 and 72, gears 23 and 74, and the attached weights 25 and 26. The rate of rotation of weights 25 and 26 is affected by the rate of rotation of the unbalanced weight assembly and the relative diameters of gears 70 and 23, and of gears 72 and 74, respectively.

The vibratory forces generated depend on the rate of rotation of the unbalanced weight assembly, the length of the arms to which the weights are attached, and the mass of the weights.

In operation, pulley 33 is rotated by a suitable motor or engine. This causes rotation of rectangular frame 19 about the axis formed by rotatively mounted shaft 34 mounted coaxially with fixed mounted shaft 12. Rotation of pinion gear 14 about fixed pinion gear 12 causes rotation of pinion shaft 15 and rotation of pulley 16. Rotation of pulley 16 is transmitted by belt 17 to pulley 18 and causes rotation of unbalanced weight assembly 60. Rotation of unbalanced weight assembly causes relative rotation between the fixedly mounted spur gear and the intermediate spur gears. Rotation of the intermediate spur gears is transmitted to the final spur gears, and causes synchronized rotation of the weights. The combination of rotation movement of the rectangular frame and the vibratory forces generated by the movement of the unbalanced weight assembly gives a stabilized vibratory motion expressed in two directions only.

There has been described novel vibratory devices for shaking applications which fulfill all the objects and advantages sought. Many changes, modifications, variations and other uses and applications of the subject invention will, however, become apparent to those skilled in the art. All such changes, modifications, variations and other uses and applications of the present invention which do not depart from the spirit and scope of the invention are deemed to be covered by the invention which is limited only by the claims which follow.

I claim:

1. A vibratory device comprising:
a base having two arms,
a rectangular frame rotatively mounted between the two arms,
a rectangular platform rotatively mounted within the rectangular frame,
means for rotating the rectangular platform as the rectangular frame rotates,
two weights mounted on the rectangular platform,
means to rotate the weights as the rectangular platform rotates,
a connecting rod connecting the weights, and
means to rotate the rectangular frame.

2. The vibratory device of claim 1 comprising means to rotate the rectangular frame through a half revolution while the rectangular platform rotates through a one quarter revolution.

3. The vibratory device of claim 2 wherein the means to rotate the rectangular frame through a half revolution while the rectangular platform rotates through a one quarter revolution comprises a first gear sprocket which rotates the rectangular platform, a second gear sprocket which is rotated by rotation of the rectangular frame, and a belt connecting said gear sprockets, said first gear sprocket having twice the diameter of said second gear sprocket.

4. The vibratory device of claim 1 wherein the connecting rod comprises a connecting rod having a shape which enables the rod to move along with the weights without interference.

5. The vibratory device of claim 4 wherein the shape of the connecting rod is rectangular.

6. The vibratory device of claim 4 wherein the shape of the connecting rod is U-shaped.

7. A vibratory device comprising:
a u-shaped base having a first and a second arm,
the first arm of the base having a shaft fixedly mounted by a first end to the first arm of the base and a second end extending into the region between the arms of the u-shaped base, the second arm of the base having a rotatively mounted shaft having a first and a second end and mounted coaxial with the fixedly mounted shaft on the first arm of the base,
the rotatively mounted shaft having a pulley on a first end outside the u-shaped base, the second end of the rotatively mounted shaft extending into the region between the arms of the u-shaped base, a rectangular frame having a first and a second long side and a first and a second short side, the second end of the rotatively mounted shaft fixedly mounted to the second short side of the rectangular frame, the first short side of the rectangular frame having a hole in which a bearing is mounted, the second end of the fixedly mounted shaft extending through the bearing in the first short side of the rectangular frame, whereby the rectangular frame is suspended between the arms of the u-shaped base and rotates when the rotatively mounted shaft is rotated, the second end of the fixedly mounted shaft having a pinion gear fixedly mounted on it, a pinion shaft rotatively mounted in and extending between the first and the second long sides of the rectangular frame, and extending through the second long side, and bearing a fixed pinion gear which meshes with the pinion gear on the fixedly mounted shaft, a pulley mounted on the end of the pinion shaft which extends outside the rectangular frame, a mounting body having two ends, one end cylindrically shaped, and the other end disc-shaped, the mounting body rotatively mounted by the cylindrically shaped end on the second long side of the rectangular frame, a stub mounted on the cylindrically shaped end of the mounting body, a pulley mounted on the stub, a belt connecting the pinion shaft pulley and stub pulley, whereby rotation of the rectangular frame causes rotation of the pinion shaft and rotation of the mounting body, the disc-shaped end of the mounting body penetrated by a hole, a mounting shaft fixedly mounted on the first long side of the rectangular frame and extending into the hole on the mounting body, whereby the mounting body is rotatively mounted in the second long side of the rectangular frame and secured by the mounting shaft, a rectangular platform having an upper and a lower surface mounted by its lower surface to the disc-shaped end of the mounting body and having a hole penetrated by the mounting shaft, a spur gear fixedly mounted on the mounting shaft at the upper surface of the rectangular platform, two intermediate spur gears rotatively mounted on the upper surface of the rectangular platform, one mounted on each side of the mounting shaft spur gear, and each meshing with the mounting shaft spur gear, two final spur gears rotatively mounted on the upper surface of the rectangular platform, each adjacent to and meshing with an intermediate spur gear, a weight arm attached to each final spur gear, a weight attached to each weight arm, a connecting rod rotatively attached to each weight, whereby rotation of the mounting body causes rotation of the intermediate spur gears, rotation of the final spur gears, and rotation of the weights, and means to rotate the pulley on the rotatively mounted shaft.

* * * * *